Patented Aug. 20, 1940

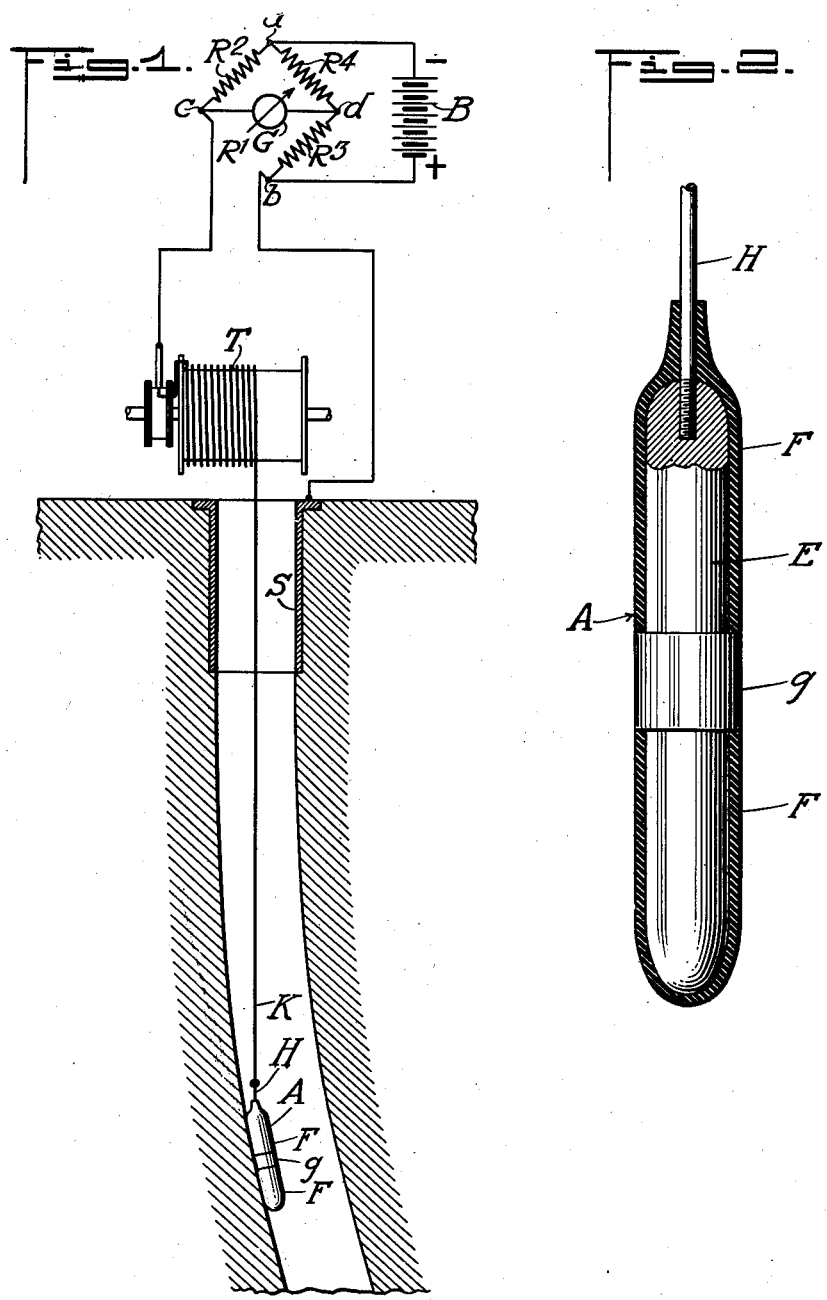

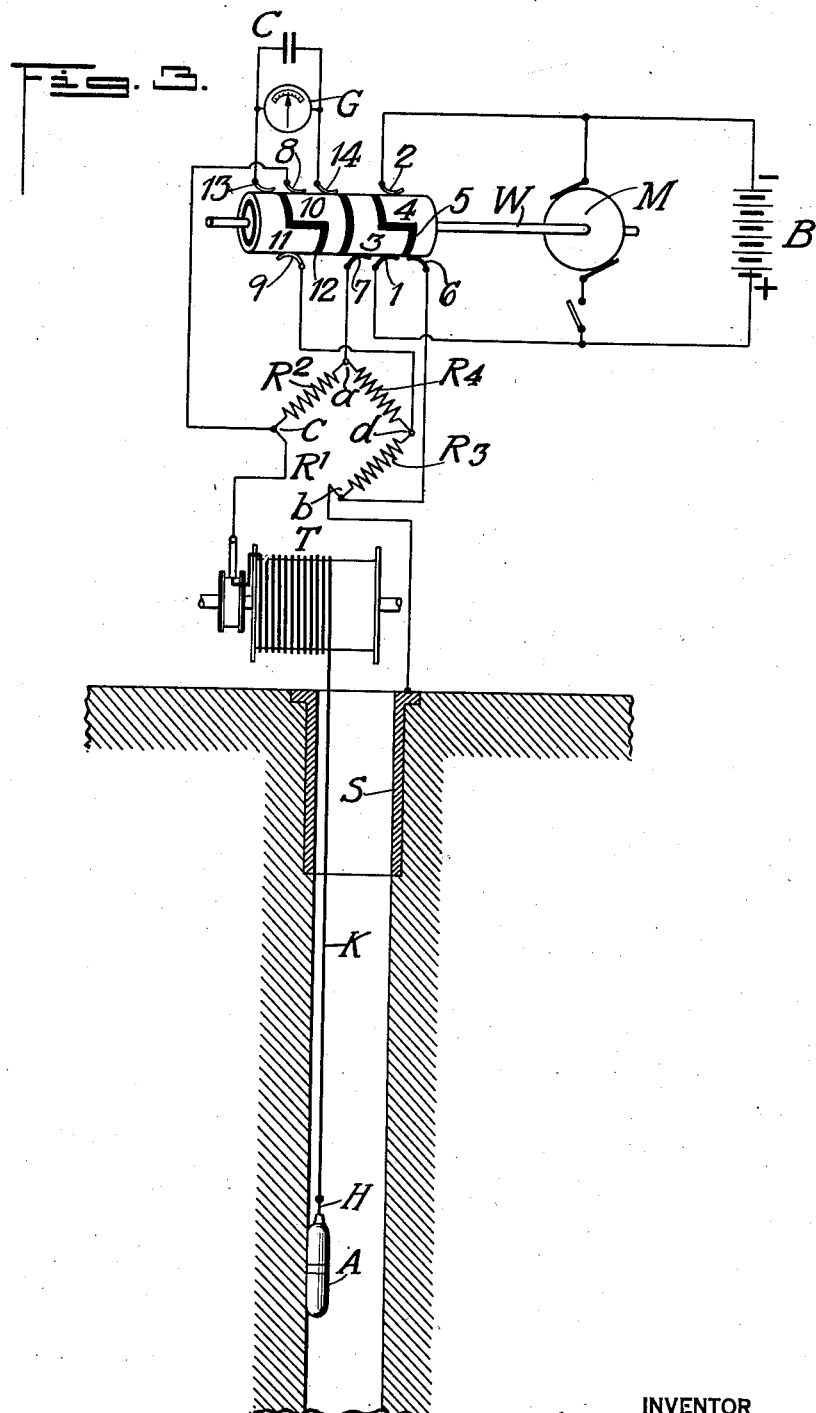

2,212,273

UNITED STATES PATENT OFFICE 2,212,273

ARRANGEMENT FOR MEASURING THE LOCAL SPECIFIC RESISTANCE OF BOREHOLE STRATA

Oscar Martienssen, Kiel, Germany

Application October 12, 1938, Serial No. 234,568
In Germany February 8, 1938

3 Claims. (Cl. 175—182)

This invention relates to an arrangement for measuring the local specific resistance of borehole strata.

The electric resistance between two electrodes immersed in a three-dimensional electrically conducting medium depends almost exclusively upon the contact resistance of these electrodes, so long as their relative distance is great with respect to the dimensions of the electrodes. This contact resistance depends only upon the form and size of the electrodes and upon the specific conduction resistance of their immediately surrounding medium. If one of the two electrodes has a very large area, the contact resistance of such an electrode may be neglected, and the resistance between the two electrodes becomes directly proportional to the specific resistance of the medium surrounding the smaller electrode. It therefore becomes possible, by measuring the resistance, to determine the specific resistance of this medium, if by an experiment the proportionality factor has been determined.

This method for determining the local specific resistance has been frequently used in geophysical measurements. It has also been used with success in boreholes, for instance in potash mining, in order to determine the location of water-carrying fissures.

The practical execution of such measurements, however, encounters difficulties which can be overcome by the present invention. The arrangement described hereinafter is particularly suited for measurements in deep boreholes but it may also be used in the same manner in measurements above ground.

The contact resistance of a spherical electrode of the radius $r$ is given by the equation $$R = \frac{\rho}{4\pi r}$$

wherein $\rho$ represents the specific resistance of the surrounding medium. One half of this resistance is located at a distance $r$ from the surface of the sphere. 90% of the resistance is located at a distance of $9r$. If the electrodes are different in shape from spherical the formula becomes more complicated. However, even in this case it is true that the resistance becomes the greater, the smaller the electrode surface, and also with the reduction in size of the surface also the "depth effect" is reduced, i. e. the distance within which the specific resistance of the surrounding medium still has an appreciable influence upon the contact resistance.

For practical measurements the contact resistance should not be too small since otherwise the influence of the conductor leading to the plummet electrode, for instance its variation in resistance with the temperature and the like, renders the measuring result uncertain. On the other hand the "depth effect" must be sufficiently great, since otherwise accidental conditions in the immediate vicinity of the electrode would influence the result in an undesirable manner.

The second condition can easily be fulfilled by using large flat electrodes such as have been proposed in the prior art. This, however, is undesirable on account of the first of the two conditions which must be fulfilled.

Careful analysis and tests have shown that both contradicting conditions can be best fulfilled if the electrode surface has the form of a cylindrical area having a height approximately equal to its diameter.

My invention is illustrated in the accompanying drawings, in which

Fig. 1 shows, diagrammatically, one method of measuring,

Fig. 2 shows in larger scale and in sectional elevation a plummet electrode according to the invention, and Fig. 3 shows, diagrammatically, a modified measuring method.

In the drawings, A is the electrode according to the invention. The electrode forms a plummet suspended from a cable K into a sludge-filled borehole. The electrode must have sufficient weight to penetrate through the sludge when lowered into the borehole and it must also have a considerably smaller diameter than the borehole in order to prevent jamming. A clearance of about 20 mm. is the minimum, but it is advisable to use even greater clearances. On the other hand, the diameter of the conventional boreholes varies between 100 and 300 mm. Sometimes larger and sometimes smaller diameters occur. The diameter of the same borehole is often smaller at greater depth than at smaller depth. Now in practice it is not convenient to carry along a large number of heavy electrodes of different diameters to be exchanged in making measurements in the borehole. Practical experience dictates making the diameter of the electrode sufficiently small so that it may be used for all standard boreholes.

Some of the prior art disclosures suggest using a sphere as an electrode. The following mathematical deduction will show the comparison of the results obtained with a spherical electrode form and an electrode form according to the present invention.

If a conductive sphere of the radius $r$ is located in a substantially homogeneous medium of the specified resistance $\rho$, the current lines will radiate from the surface of the sphere in all directions. The contact resistance up to the distance $s$ from the center of the sphere is obtained by the equation:

$$R=\int_{r}^{s}\frac{ds}{4\pi s^{2}}\cdot\rho$$

because the current lines of the length $ds$ at the distance $s$ from the center of the sphere have available a cross-sectional area of $4\pi s^{2}$. If we solve integral we obtain $$R=\rho\left(\frac{1}{2\pi r}-\frac{1}{2\pi s}\right)$$

and if the distance $s=\infty$ we obtain $$R_{\infty}=\rho\frac{1}{2\pi r}$$

If we assume in this formula that $s=.5$ ohm per cubic meter, or 50 ohms per cubic centimeter (and much lower values often occur in practice), we would obtain according to the formula, for a sphere of 5 centimeters diameter, $$R_{\infty}=3.2\Omega$$

This value is too small to permit in view of it the neglect of the resistance variations in the supply cable due to changes in temperature and other influences. Besides, the weight of such a sphere, when made of lead, is only about 0.8 kg. It is entirely out of the question to lower such a light sphere on a cable into a borehole filled with heavy sludge. On the other hand, the problem to attach to such a sphere a heavy weight in a conducting medium, and to avoid electric connection between such a weight and the sphere, is difficult to solve, and so far as applicant is aware has not yet been solved.

One half of the contact resistance in case of a sphere is at the distance $2r$. The current lines which emanate from the top and the bottom of the sphere close their paths entirely within the sludge of the borehole. Even the current lines which emanate laterally at an inclination still close in the proximity of the sphere surface and mostly in the heavy sludge where they alone contribute substantially to the resistance. Practical tests have shown that in a borehole of approximately 200 mm. diameter, about 90% of the total contact resistance is due to the sludge, and therefore it is out of the question to draw conclusions of any value from the measured contact resistance with respect to the specific resistance of the adjoining strata. Therefore, the spherical form of the electrode is entirely unsuitable for measurements such as are contemplated in the present case.

If it were possible to build a cylindrical electrode from which the current lines would radiate from the cylindrical surface only exactly radially, and would remain in radial direction, the contact resistance would be derived according to the following formula:

$$R=\frac{\rho}{2\pi d}\int_{r}^{s}\frac{ds}{s}=\frac{\rho}{2\pi d}(\log s-\log r)$$

and for $$s=\infty,\ R_{\infty}=\infty$$

In this formula $d$ represents the height of the cylinder. Here even the remotest portions of the adjoining stratum have an influence upon $R$, since the cross section available for the current lines increases only linearly with $r$. A conclusion as to the value of $\rho$, however, would also not be feasible at an infinitely great resistance.

Accordingly, the present invention contemplates the middle of the road, namely, an arrangement in which the resistance is essentially greater than that of a sphere but not infinite, and in which the current paths change their direction only at a substantial distance from the electrode, and therefore have the effect that the contact resistance resides largely in the more remote portions of the stratum. In Fig. 2 of the drawings, in which $g$ represents the conductively exposed portion of a cylindrical electrode, the path of the current lines is indicated. This path corresponds with the required conditions of current lines emanating from the electrode surface in horizontal direction, at right angles to the cylindrical surface, and become curved only at quite a distance from the cylinder surface. The contact resistance of such an electrode at practically possible dimensions is sufficiently great, and very essentially greater than that of a sphere, and thus the surrounding strata, even at a distance equal to ten times the radius of the cylinder, appreciably contribute to the total contact resistance.

Experiments and contemplations show that the conditions are most favorable if the length of the cylindrical contact surface is equal the diameter of the cylinder. If the contact portion of the cylinder is made longer, the contact resistance soon decreases proportionally with the length, and it again becomes too small for practical measurements. With the dimensions suggested according to the present invention, the resistance varies very little with the length. If, on the other hand, the cylinder area is made essentially shorter than suggested herein, the resistance greatly increases, but then, owing to the strong curvatures of the current lines, it becomes located essentially in the vicinity of the electrode surface and thus in the sludge. If the length of the cylinder is made infinitely small, the entire contact resistance would become located at infinite proximity of the cylinder.

Experiments have shown that with an electrode of the form suggested and otherwise adapted to the conventional borehole diameters under the conditions stated hereinabove, the contact resistance remains sufficiently large and about 90% of it is located in the surrounding strata and not in the sludge. The large cylindrical electrodes used in the prior art methods do not fulfill these requirements so far as I have been able to ascertain.

Accordingly, the problem which the present invention solves is to provide an electrode in the form of a cylindrical body of sufficient size and weight to penetrate with certainty through the sludge, and yet to present to the surrounding sludge a conductive cylindrical area only of a height substantially equal to the cylinder diameter.

Referring to Figs. 1 and 2, the insulated cable K from which the electrode A is suspended is wound on the cable drum T. The cable resistance, together with the contact resistance of the electrode with respect to the ground, represents the resistance $R_1$, which latter is combined together with the three resistances $R_2$, $R_3$ and $R_4$ into a Wheatstone bridge. Resistance $R_3$ is connected to the lining S of the borehole, the contact resistance of which may be considered negligibly small. The plus pole of a measuring battery B is also connected to the borehole lining S and the milliammeter G is connected into the bridge branch of the Wheatstone bridge. The bridge current becomes zero if the relation exists $R_1:R_2=R_3:R_4$. If the contact resistance of electrode A and thus resistance $R_1$ varies, the instrument responds and the extent of its response is a measure for the resistance variation.

Since electrode A is partly in contact with the borehole sludge and partly in contact with the surrounding stratum, its contact resistance becomes also dependent upon the specific resistance of the sludge. This resistance, however, is approximately uniform in the entire borehole, because through the reciprocating motions of the bore rods and during the boring operation the sludge remains thoroughly stirred up. Its influence therefore is eliminated in the observation of the resistance variation.

Since no borehole runs absolutely vertical, the electrode A almost always is in contact with the borehole wall, as is shown in Fig. 1 and it therefore cannot exert a variable influence upon the sludge by oscillating in the borehole.

The measurement of the specific resistance of the adjacent strata is performed by observing, during the lowering or raising of the electrode, the ammeter responses which may be recorded on a recording strip moved forward in accordance with the electrode movements (not shown in the drawings).

The plummet electrode is shown in detail in Fig. 2. It consists of a lead core E, and a hard rubber insulation F arranged so that only a cylindrical area $q$ remains exposed to the outside and whose height is equal to its diameter. This I shall call the effective height of the electrode, because only from this portion of the electrode, as compared with the remainder of its height, the current lines emanate into the borehole. The insulation F may be composed also entirely or partly of soft rubber, or any other suitable waterproof insulating material. The bolt H is threaded into the lead electrode and connected mechanically and electrically in suitable manner (not shown) with the conductor of the cable, the joint between the cable and the bolt being surrounded by rubber insulation in order to avoid variation of the contact resistance.

Further difficulties are encountered in using such a measuring method by the potential, which is due to polarization of the electrode and which produces errors in the measuring results. So-called non-polarizable electrodes as are used above ground for many purposes are not practical to use in a borehole, because the clay vessel which surrounds such electrodes and which contains metal salts, is apt to break, due to the shocks and high pressures encountered in a borehole. Also the sediment of the sludge is apt to deposit in the clay vessel.

Extensive tests have shown that lead may be used as an electrode, provided it is connected with the negative pole of the battery and provided the current intensity is maintained reasonably low. Under such conditions a lead electrode does not produce a variable polarization potential. The polarization potential at the borehole lining S does not interfere because this potential remains constant.

Aside from these polarization potentials further errors may be due to the natural potential differences which may occur between the borehole liquid and the adjacent strata. These may have the form of electrolytic potentials, concentration potentials, diffusion potentials, phase threshold potentials, flow potentials, or the like. These potentials together seldom attain values higher than 50 millivolts. Therefore if the potential of the measuring battery B is chosen 10 volts or higher, these aforementioned detrimental potentials assume a negligible value.

If it is desired to avoid the influence of all these detrimental potentials entirely, it becomes necessary to use alternating current for the measurement. In this case, however, the inductive resistance of the cable winding on the drum T becomes a disturbing factor. This inductive resistance varies with the rise and fall of the plummet and thus introduces errors into the measurement. In order to reduce this error to an admissible value, it becomes necessary to use for measurement an alternating current of very low frequency, for instance of about 5 cycles per second or less. If it is still desired to use a direct current ammeter for measurement, the following arrangement has proven to be practical.

The current delivered by the measuring battery is commutated about 10 times per second by means of a rotating commutator and at the same time, by means of a second commutator mounted on the same shaft with the first one, the bridge current supplied to the ammeter is rectified. The current which is produced in the borehole by the aforementioned natural potentials and which does not flow over the first commutator, is converted by the second commutator into alternating current which does not produce an effect on the direct current instrument. On the other hand, the battery current which is converted by the first commutator into the alternating current and re-converted into direct current by the second commutator, manifests itself in the instrument.

It is true the low frequency of the alternating current causes the hand of the instrument to vibrate. However, such vibrations may be suppressed to a large extent by connecting a comparatively large condenser in parallel with the instrument. An arrangement involving the foregoing features is shown in Fig. 3. The Wheatstone bridge is connected with the electrode A in the borehole in the same manner as shown and described with reference to Fig. 1. The current supplied from battery B rotates by means of a small motor M the shaft W at a speed of about 3 to 5 revolutions per second, by means of a gear not shown. The current from the battery is also supplied to the commutator brushes 1 and 2 which contact with the commutator segments 3 and 4 separated by insulating material 5. Due to the form of the commutator segments shown, brush 1 contacts for one half revolution with segment 3 and during the next half revolution with segment 4, while brush 2 at the same time alternately contacts with segments 4 and 3, respectively. By means of brushes 6 and 7 which respectively remain constantly in contact with segments 3 and 4, an alternating current is derived which is supplied to the points $a$ and $b$ of the measuring bridge. The points $c$ and $d$ of the bridge are connected with commutator brushes 8 and 9 which alternately contact with segments 10 and 11 of the commutator. From these segments the current is supplied to the ammeter G by means of brushes 13 and 14. Thus the alternating current which is supplied by brushes 6 and 7 to the bridge is re-converted into direct current by means of brushes 13 and 14 and segments 10 and 11 before it reaches the ammeter. On the other hand the undesired currents which are produced in the borehole and which flow through resistance R₁, only pass over the second commutator and do not influence the direct current instrument, because they are converted only into alternating currents by the commutator.

The large condenser C connected in parallel to the instrument, reduces the vibrations of the instrument hand and thus also smooths out the recording curve on the recording strip (not shown).

I claim:

1. In an arrangement for measuring in boreholes the variation of the contact resistance of an electrode disposed in the borehole, an electrode in the form of a cylindrical body of lead, surrounded by insulating material at both of its ends so as to expose a central cylindrical contact surface whose height is substantially equal to the cylinder diameter.

2. In an arrangement for determining the specific resistance of geological strata by measuring the contact resistance of an electrode lowered into a sludge-containing borehole, a plummet of sufficient weight to penetrate through the sludge, said plummet comprising a body of lead having an exposed cylindrical electrode surface whose height is substantially equal to its diameter, and insulating means covering the remaining surface portions of said body.

3. In an arrangement for electrically measuring in boreholes the variation of the contact resistance of an electrode disposed in the borehole, an electrode in the form of an elongated massive plummet having at one end suspension means for being suspended from a cable and comprising an electrode body having a cylindrical surface forming part of the outer surface of said plummet, said cylindrical surface having a height in the order of magnitude of its diameter, and insulating means for rendering the other surface portions of said electrode body electrically ineffective.

OSCAR MARTIENSSEN.